Patented Nov. 16, 1937

2,098,985

UNITED STATES PATENT OFFICE 2,098,985

7-HYDROXY-CHOLESTEROL

Adolf Windaus, Goettingen, and Friedrich Schenck, Wuppertal-Elberfeld, Germany, assignors to Winthrop Chemical Company, Inc., New York, N. Y., a corporation of New York No Drawing. Application March 5, 1937, Serial No. 129,189. In Germany March 20, 1935

1 Claim. (Cl. 260—153)

This invention relates to 7-hydroxy-cholesterol.
In our copending application for Letters Patent Serial No. 69,590, filed March 18, 1936, of which this application is a continuation in part, we have described the manufacture of 7-dehydro-sterols, for instance, of 7-dehydro-cholerterol while starting with 7-oxo-sterols, their acyl derivatives respectively. 7-oxo-cholerterol e. g., has been transformed into 7-dehydro-cholesterol.

This application refers to the said 7-hydroxy-cholesterol of the formula:

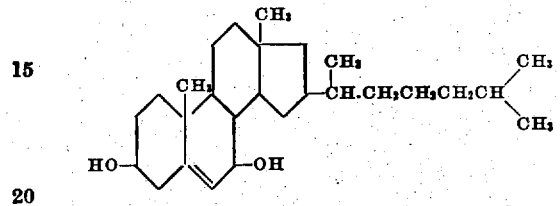

which is an intermediate product in the said manufacture, and to its acyl derivatives. The 7-hydroxy-cholesterol forms white needle crystals which show a characteristic melting point of 178° C.; it is best characterized by its crystalline ester derivatives; its dibenzoate, for instance, is obtained in the form of white crystals which sharply melt at 172.5–173.5° C. By saponification of the esters, the 7-hydroxy-cholesterol is recovered. Our new 7-hydroxy-cholesterol obtained from 7-oxo-cholesterol, essentially differs in many respects from the compound which is known in the literature under the name "Oxycholesterin" (compare, for instance, Ber. der deutschen Chem. Ges. 47, page 1454), hydroxy-cholesterol respectively, and which has been obtained from cholesterol by oxidation with benzoyl peroxide. The position of the second hydroxyl group which is said to be introduced into the cholesterol molecule by the said oxidation process is not known, as, on the whole, the chemical character of the said non-crystalline oxidation product is still to be elucidated. Contrary to 7-hydroxy-cholesterol the said hydroxy-cholesterol is an amorphous light yellow substance, similar in appearance to amber. While the crystalline 7-hydroxy-cholesterol is difficultly soluble in cold petroleum ether, the known hydroxy-cholesterol readily dissolves in cold petroleum ether. On acting upon the known hydroxy-cholesterol with benzoyl chloride in the same manner as upon 7-hydroxy-cholesterol no crystals are obtainable but only a varnish-like brilliant, glass-like transparent, absolutely amorphous substance (compare "Zeitschrift für physiol. Chemie", 96, page 345). In the so-called "Salkowski's test" in which the sterol compound is dissolved in chloroform and concentrated sulfuric acid admixed thereto, our new 7-hydroxy-cholesterol yields a blue coloration of the chloroform layer and a red coloration with green fluorescence of the sulfuric acid layer, whereas the known hydroxy-cholesterol yields a red coloration in the chloroform layer. The sulfuric acid layer also in this case has a red coloration with green fluorescence as is the case with most sterol compounds. Furthermore, a solution of 7-hydroxy-cholesterol in glacial acetic acid takes a pure blue coloration on the addition of concentrated sulfuric acid, whereas the known hydroxy-cholesterol under the same conditions yields a violet colored solution.

In accordance with our invention 7-hydroxy-cholesterol is obtained by reacting upon a 7-oxo-cholesteryl-ester, for instance, 7-oxo-cholesteryl-acetate, with an aluminium alcoholate, preferably with the alcoholate of a secondary alcohol, such as aluminium isopropylate in the presence of an alcohol. Advantageously the same alcohol is used as diluent which is present in the aluminium alcoholate. The treatment with the aluminium alcoholate has the effect that the 7-oxo group of the initial compound is reduced to the 7-hydroxy group without simultaneously reducing the double bond in the 5.6-position of the cholesterol compound. But simultaneously with the reduction of the oxo group saponification of the ester group takes place. The 7-hydroxy-cholesterol formed is separated from the aluminium compound in the usual manner and is finally obtained by recrystallization in the form of white needles as indicated above. Its esters are obtained by the usual esterification processes, for instance, by means of benzoyl chloride, acetyl chloride, acetic acid anhydride. The esterification is advantageously carried out in the presence of a base, such as pyridine. On saponification of the well crystallized esters of a sharp melting point, the 7-hydroxy-cholesterol is again obtained in the form of white needles which show a characteristic melting point of 178° C.

The invention is further illustrated by the following examples without being restricted thereto:

*Example:*—For obtaining 7-hydroxy-cholesterol 50 grams of 7-oxo-cholesteryl acetate are dissolved in 500 ccs. of dry isopropyl alcohol and after the addition of 20 grams of liquefied aluminium isopropylate heated to boiling for 5 hours. After reduction is complete with the simultaneous splitting off of the acetyl group the isopropyl-alcoholic solution is diluted with ether. The ethereal solution is first extracted with normal hydrochloric acid, then, after removing the aluminium hydroxide, with water. The dried ethereal solution is concentrated to about 100-150 ccs. and treated with the five-fold quantity of petroleum ether, whereupon abundant quantities of the 7-hydroxy-cholesterol separate in colorless jelly balls which are filtered with suction and washed with petroleum ether. By evaporating the mother lye to a small volume and by diluting with petroleum ether further quantities of 7-hydroxy-cholesterol may be obtained. On recrystallization the 7-hydroxy-cholesterol is obtained in the form of white needles, which on heating melt at about 178° C. The 7-hydroxy-cholesterol yields immediately an intensive blue coloration when heated on the water-bath with chloral hydrate. In the Salkowski reaction the sulfuric acid takes a red coloration, the chloroform a blue coloration, an intensive green fluorescence occurring simultaneously. With antimony trichloride in chloroform a deep blue coloration is obtained after a short time.

For obtaining 7-hydroxy-cholesterol-dibenzoate 30 grams of 7-hydroxy-cholesterol are dissolved in 200 ccs. of pyridine and treated with a mixture of 30 grams of benzoyl chloride and 30 grams of pyridine. After standing for 24 hours, the benzoylation product is precipitated with 600 ccs. of water. The oily precipitate after settling is again shaken with 500 ccs. of fresh water. The water is poured off and the crude benzoate, covered with methyl alcohol, is left standing for several hours, whereupon it gradually turns to a white crystal powder. The latter is filtered, washed with methyl alcohol and recrystallized from ether-methyl alcohol for further purification. In this manner thin needles are obtained in a good yield which melt at 172.5-173.5° C. The 7-hydroxy-cholesterol-dibenzoate displays the same color reactions as the 7-hydroxy-cholesterol. By saponification the 7-hydroxy-cholesterol is recovered in the form of crystals showing the properties indicated above.

In an analogous manner the 7-hydroxy-cholesterol-diacetate is obtained when reacting upon 10 grams of 7-hydroxy-cholesterol with 10 grams of acetic acid anhydride in the presence of 50 ccs. of pyridine. The diacetate exists in two isomorphous forms which melt at 98° C.-100° C. and 106.5° C.-107.5° C. respectively.

We claim:—

7-hydroxy-cholesterol, forming white crystals yielding an intensive blue coloration when heated on the water-bath with chloral hydrate, yielding in the Salkowski reaction a blue coloration of the chloroform solution, forming in the form of its dibenzoate white crystals melting at 172.5-173.5° C.

ADOLF WINDAUS.
FRIEDRICH SCHENCK.

Certificate of Correction

Patent No. 2,098,985.

November 16, 1937.

ADOLF WINDAUS ET AL.

It is hereby certified that error appears in the printed specification of the above numbered patent requiring correction as follows: Page 1, first column, line 15, in the formula, for read

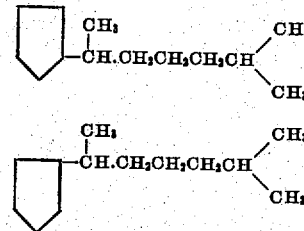

and that the said Letters Patent should be read with this correction therein that the same may conform to the record of the case in the Patent Office.

Signed and sealed this 8th day of February, A. D. 1938.

[SEAL]

HENRY VAN ARSDALE,
*Acting Commissioner of Patents.* ethereal solution is first extracted with normal hydrochloric acid, then, after removing the aluminium hydroxide, with water. The dried ethereal solution is concentrated to about 100-150 ccs. and treated with the five-fold quantity of petroleum ether, whereupon abundant quantities of the 7-hydroxy-cholesterol separate in colorless jelly balls which are filtered with suction and washed with petroleum ether. By evaporating the mother lye to a small volume and by diluting with petroleum ether further quantities of 7-hydroxy-cholesterol may be obtained. On recrystallization the 7-hydroxy-cholesterol is obtained in the form of white needles, which on heating melt at about 178° C. The 7-hydroxy-cholesterol yields immediately an intensive blue coloration when heated on the water-bath with chloral hydrate. In the Salkowski reaction the sulfuric acid takes a red coloration, the chloroform a blue coloration, an intensive green fluorescence occurring simultaneously. With antimony trichloride in chloroform a deep blue coloration is obtained after a short time.

For obtaining 7-hydroxy-cholesterol-dibenzoate 30 grams of 7-hydroxy-cholesterol are dissolved in 200 ccs. of pyridine and treated with a mixture of 30 grams of benzoyl chloride and 30 grams of pyridine. After standing for 24 hours, the benzoylation product is precipitated with 600 ccs. of water. The oily precipitate after settling is again shaken with 500 ccs. of fresh water. The water is poured off and the crude benzoate, covered with methyl alcohol, is left standing for several hours, whereupon it gradually turns to a white crystal powder. The latter is filtered, washed with methyl alcohol and recrystallized from ether-methyl alcohol for further purification. In this manner thin needles are obtained in a good yield which melt at 172.5-173.5° C. The 7-hydroxy-cholesterol-dibenzoate displays the same color reactions as the 7-hydroxy-cholesterol. By saponification the 7-hydroxy-cholesterol is recovered in the form of crystals showing the properties indicated above.

In an analogous manner the 7-hydroxy-cholesterol-diacetate is obtained when reacting upon 10 grams of 7-hydroxy-cholesterol with 10 grams of acetic acid anhydride in the presence of 50 ccs. of pyridine. The diacetate exists in two isomorphous forms which melt at 98° C.-100° C. and 106.5° C.-107.5° C. respectively.

We claim:—

7-hydroxy-cholesterol, forming white crystals yielding an intensive blue coloration when heated on the water-bath with chloral hydrate, yielding in the Salkowski reaction a blue coloration of the chloroform solution, forming in the form of its dibenzoate white crystals melting at 172.5-173.5° C.

ADOLF WINDAUS.
FRIEDRICH SCHENCK.

Certificate of Correction

Patent No. 2,098,985.

November 16, 1937.

ADOLF WINDAUS ET AL.

It is hereby certified that error appears in the printed specification of the above numbered patent requiring correction as follows: Page 1, first column, line 15, in the formula, for read

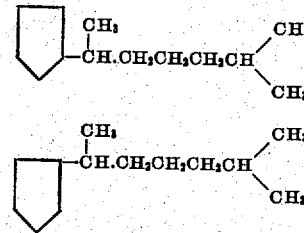

and that the said Letters Patent should be read with this correction therein that the same may conform to the record of the case in the Patent Office.

Signed and sealed this 8th day of February, A. D. 1938.

[SEAL]

HENRY VAN ARSDALE,
*Acting Commissioner of Patents.*

Certificate of Correction

Patent No. 2,098,985. November 16, 1937.

ADOLF WINDAUS ET AL.

It is hereby certified that error appears in the printed specification of the above numbered patent requiring correction as follows: Page 1, first column, line 15, in the formula, for read

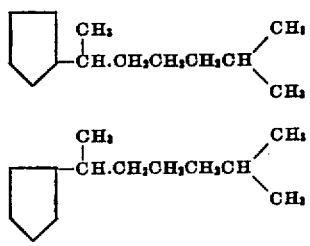

and that the said Letters Patent should be read with this correction therein that the same may conform to the record of the case in the Patent Office.

Signed and sealed this 8th day of February, A. D. 1938.

[SEAL]  HENRY VAN ARSDALE,
*Acting Commissioner of Patents.*